United States Patent
Trego et al.

(10) Patent No.: US 6,595,306 B2
(45) Date of Patent: Jul. 22, 2003

(54) SUPPLEMENTAL WALK ALONG CONTROL FOR WALKIE/RIDER PALLET TRUCKS

(75) Inventors: Allen T. Trego, New Bremen, OH (US); John I. Koeper, New Bremen, OH (US); Robert J. Henshaw, Newnan, GA (US)

(73) Assignee: Crown Equipment Corporation, New Bremen, OH (US)

( * ) Notice: Subject to any disclaimer, the term of this patent is extended or adjusted under 35 U.S.C. 154(b) by 72 days.

(21) Appl. No.: 09/925,268

(22) Filed: Aug. 9, 2001

(65) Prior Publication Data

US 2003/0029647 A1 Feb. 13, 2003

(51) Int. Cl.[7] .............................................. B62D 51/04
(52) U.S. Cl. ...................... 180/19.2; 180/19.3; 180/334
(58) Field of Search ............................... 180/19.1, 19.2, 180/19.3, 332, 333

(56) References Cited

U.S. PATENT DOCUMENTS

| | | | |
|---|---|---|---|
| 2,804,174 A | * | 8/1957 | Chasar |
| 3,791,474 A | | 2/1974 | Stammen et al. |
| 3,876,024 A | * | 4/1975 | Shieman et al. .......... 180/19 R |
| 3,933,224 A | * | 1/1976 | Nilsson et al. ............ 187/9 R |
| 4,043,472 A | * | 8/1977 | Hoyt ........................ 214/750 |
| 4,287,966 A | * | 9/1981 | Frees ........................ 187/9 R |
| 4,336,860 A | * | 6/1982 | Noller et al. ............. 180/273 |
| 4,716,980 A | | 1/1988 | Butler |
| 4,993,509 A | | 2/1991 | Howell |
| 5,245,144 A | | 9/1993 | Stammen |
| 5,595,259 A | | 1/1997 | Gilliland et al. |
| 5,890,562 A | | 4/1999 | Bartels et al. |
| 5,964,313 A | | 10/1999 | Guy |
| 6,382,359 B1 | | 5/2002 | Lohmann |
| 6,464,025 B1 | * | 10/2002 | Koeper et al. ............. 180/19.2 |

OTHER PUBLICATIONS

Crown Low Level Order Picker Series GPC 2000 Specifications; Jan., 2000; VFS–GPC–04–GB; Crown Gabelstapler GmbH; Roding Germany.

* cited by examiner

Primary Examiner—Avraham Lerner
(74) Attorney, Agent, or Firm—Stevens & Showalter LLP

(57) ABSTRACT

Supplemental walk along control for walkie/rider pallet trucks is provided by supplemental jog switches and coast release switches provided adjacent to the base of load carrying forks. The supplemental jog switches are enabled during coasting operation so that operators can advance to the base of the forks to accelerate the trucks between closely spaced picks located along substantially straight portions of pick routes. For application of the trucks' brakes, the operators activate the coast release switches to release the coast mode and enable deadman brake mechanisms to brake the trucks. A steering direction detector is provided to determine the direction of the steered wheel so that if the steered wheel is not directed substantially straight ahead, then operation of the truck from the supplemental jog switches is disabled.

30 Claims, 8 Drawing Sheets

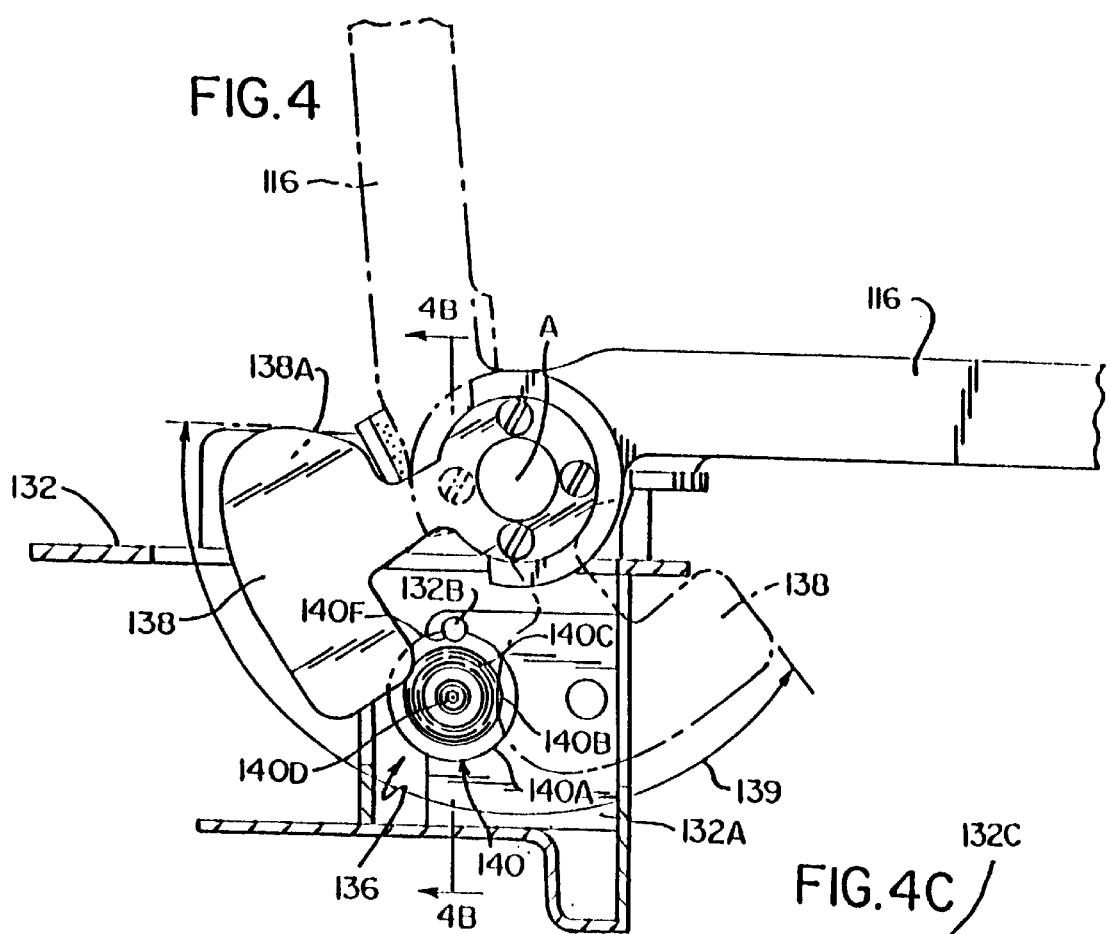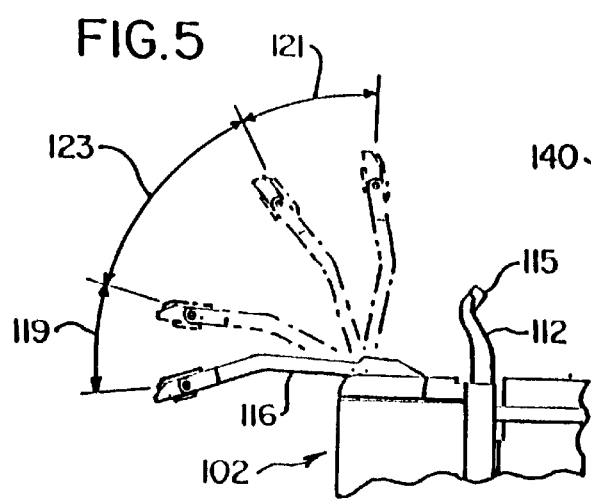

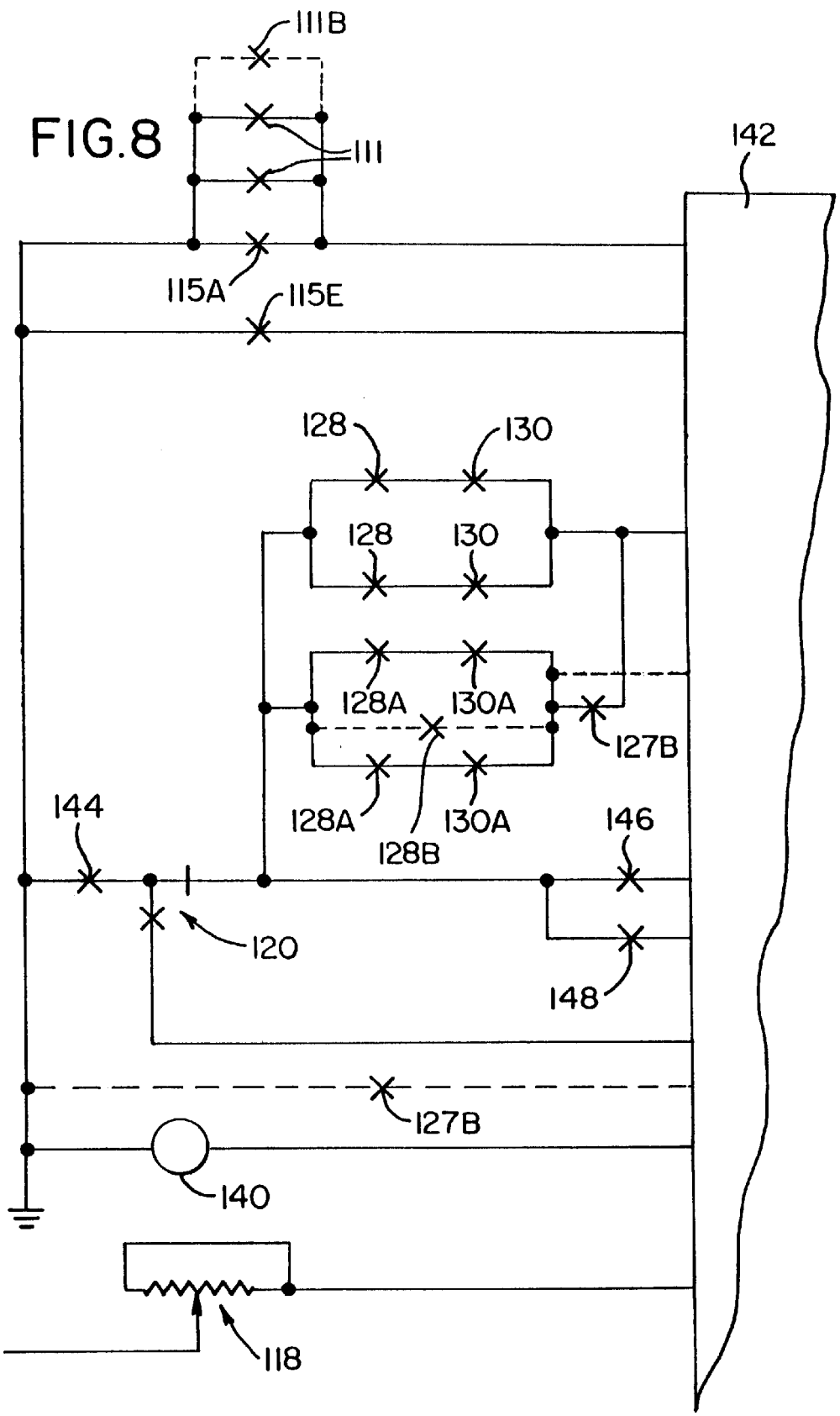

SUPPLEMENTAL WALK ALONG CONTROL FOR WALKIE/RIDER PALLET TRUCKS

CROSS-REFERENCE TO RELATED APPLICATIONS

The present application is related to application Ser. No. 09/855,333, filed May 15, 2001, for COAST CONTROL FOR WALKIE/RIDER PALLET TRUCK (Attorney Docket No. CRN 298 PA), now U.S. Pat. No. 6,464,025, which is assigned to the assignee of the present application and is incorporated herein by reference.

BACKGROUND OF THE INVENTION

The present invention relates in general to end controlled walkie/rider pallet trucks commonly used for picking stock in large warehouses and, more particularly, to a supplemental walk along control arrangement for improved operation of such pallet trucks.

A typical walkie/rider pallet truck includes load carrying forks and a power unit having a steerable wheel, a steering control mechanism, a brake including a deadman brake mechanism, an electric traction motor, a storage battery and a platform onto which the operator may step and ride while controlling the truck. The steering mechanism normally has a handle mounted at the end of a movable steering arm with the handle including controls for raising and lowering the forks and rotatable twist grips or comparable devices to control the speed and direction (forward and reverse) of the truck. A switch for reversing vehicle travel direction when traveling in the power unit first or forward direction and a horn switch are also normally provided on the handle.

In stock picking operations, a truck operator typically follows a winding, unidirectional route through the warehouse, picking up stock in a predetermined sequence in order to maximize productivity. The operator normally walks alongside the truck when the distance along the route between picks is short and steps onto the truck platform to ride when the distance between picks is longer, for example twenty or more feet. When the operator is riding on the truck platform, it is desirable for optimum work productivity to move the truck at higher speeds than when the operator is walking beside it. To this end, speed controllers that include high and low speed control circuits are provided.

For movement of the truck, the operator grasps the handle and moves the steering arm into a truck operating range between a generally vertical (up) braking position and a generally horizontal (down) braking position. If the operator releases the handle, the deadman brake mechanism, for example comprising an arm return spring, forces the arm to the up braking position which actuates a vehicle brake, for example a spring-loaded brake, to stop the truck. The operator can also actuate the brake by bringing the steering arm to the down braking position. Thus, the walkie/rider pallet truck may be in either a braking or non-braking mode, depending on the position of the steering arm within specified braking and operating arcs.

Rotation of the twist grips controls movement of the truck: rotation of either grip in one direction causes the truck to move with the power unit leading, the forward direction, while rotation in the opposite direction causes the truck to move with the load carrying forks leading, the backward or reverse direction. Increased rotation of the grip in either direction, when operated in either the walkie or the rider mode, results in an increase in the power supplied to the electric motor causing the truck to move at a higher speed in the corresponding forward or reverse direction.

In addition to the motion control provided by the rotatable twist grips, rider pallet trucks may also include side or "jog" switches. The jog switches can be used by an operator walking alongside the truck to accelerate the truck to a walking speed of around 3.5 miles per hour (mph) (5.6 km/hr) to move from one stock pick position to the next stock pick position. A single jog switch is normally provided on each side of the handle either on an outer portion of the handle or on an inner, protected portion of the handle. An example of another jog switch arrangement, wherein a pair of switches, one on the outside of the handle and one on the inside of the handle, is provided on each side of the handle and both switches must be activated to move the truck, is illustrated in U.S. Pat. No. 5,245,144 which is entitled WALK ALONG HAND GRIP SWITCH CONTROL FOR PALLET TRUCK which issued on Sep. 14, 1995 to the assignee of the present application and is incorporated herein by reference.

The efficiency of order picking is severely hampered if the brake is activated every time an operator releases the steering arm. Thus, brake override, or coasting, systems have been developed to override the deadman brake mechanism by preventing the steering arm from entering the up braking position when the operator releases the handle/steering arm while walking alongside the truck. During typical operation, an operator may use one of the jog switches to accelerate the truck to walking speed. When approaching a stopping point, the operator releases the jog switch and allows the truck to coast to a stop while the operator moves to an adjacent rack or shelf to pick up an item and place it on a pallet on the forks. The operator plans the coast of the truck so that the pallet on the forks will stop near the operator's position at about the same time that the operator is ready to place the item onto the pallet. After loading the pick onto the truck, the operator again operates one of the jog switches and moves the truck toward the next pick location.

The rate of acceleration and speed of the truck are controlled by switching a jog switch on and off. The coast distance is controlled by controlling the truck's travel speed when the jog switch is released and of course the position of the truck relative to the pick when the jog switch is released. Generally, use of the vehicle brake is not necessary during coasting operation; however, the vehicle brake is available to the operator as needed.

While coasting increases the efficiency of picking operations, after making a pick, the operator still must move from the forks to the handle to once again move the truck using either the twist grips or the jog switches. Over the course of a day's picking operations, the operator may walk a substantial distance just to be able to once again operate the truck after such coasting/picking operations.

Accordingly, there is a need for a supplemental walk along control for walkie/rider pallet trucks that would substantially reduce if not eliminate the short but numerous walks from the forks of a truck to the control handle of the truck that an operator must now make between closely spaced picks. The supplemental walk along control would be placed closely adjacent a load backrest associated with the forks so that rather than having to walk to the handle, the operator can control the truck from the vicinity of the load backrest. The operator would be able to jog the truck from pick to pick in the coast mode and could apply the brake by releasing the coast mode to enable the deadman mechanism to apply the vehicle brake.

SUMMARY OF THE INVENTION

This need is met by the invention of the present application wherein supplemental walk along control for walkie/ rider pallet trucks is provided by supplemental jog switches and coast release switches provided substantially adjacent to the bases of load carrying forks of the trucks. The supplemental jog switches are enabled for coasting operation of the trucks so that, for closely spaced picks located along substantially straight portions of pick routes, operators need only advance to the bases of the load carrying forks and activate the supplemental jog switches to accelerate the trucks to walking speed. If the trucks' brakes need to be applied, the operators can activate the coast release switches to release the coast mode and enable deadman brake mechanisms to brake the trucks. A steered direction detector may be provided on each truck to determine the direction of the steered wheel of the truck. If the steered wheel is not directed substantially straight ahead, as should be the case for travel along a substantially straight portion of the pick route, then operation of the truck from the supplemental jog switch(es) may be disabled.

Additional features and advantages of the invention will be apparent from the following description, the appended claims and the accompanying drawings.

BRIEF DESCRIPTION OF THE DRAWINGS

FIG. 4 is a partially broken away side view of a portion of the steering control unit of the truck of FIG. 1 showing a steering arm locking device for placing the truck into a coast mode of operation;

FIG. 4C is a partially sectioned view of an alternate embodiment of the electromagnet of the steering arm brake taken along the section line 4B—4B of FIG. 4;

FIG. 5 is a side view of a portion of the truck of FIG. 1 showing the pivoting motion of a steering arm/handle combination of the truck of FIG. 1;

FIG. 8 is a schematic block diagram of a portion of the control system for the truck of FIG. 1.

DETAILED DESCRIPTION OF THE INVENTION

Figure 1:
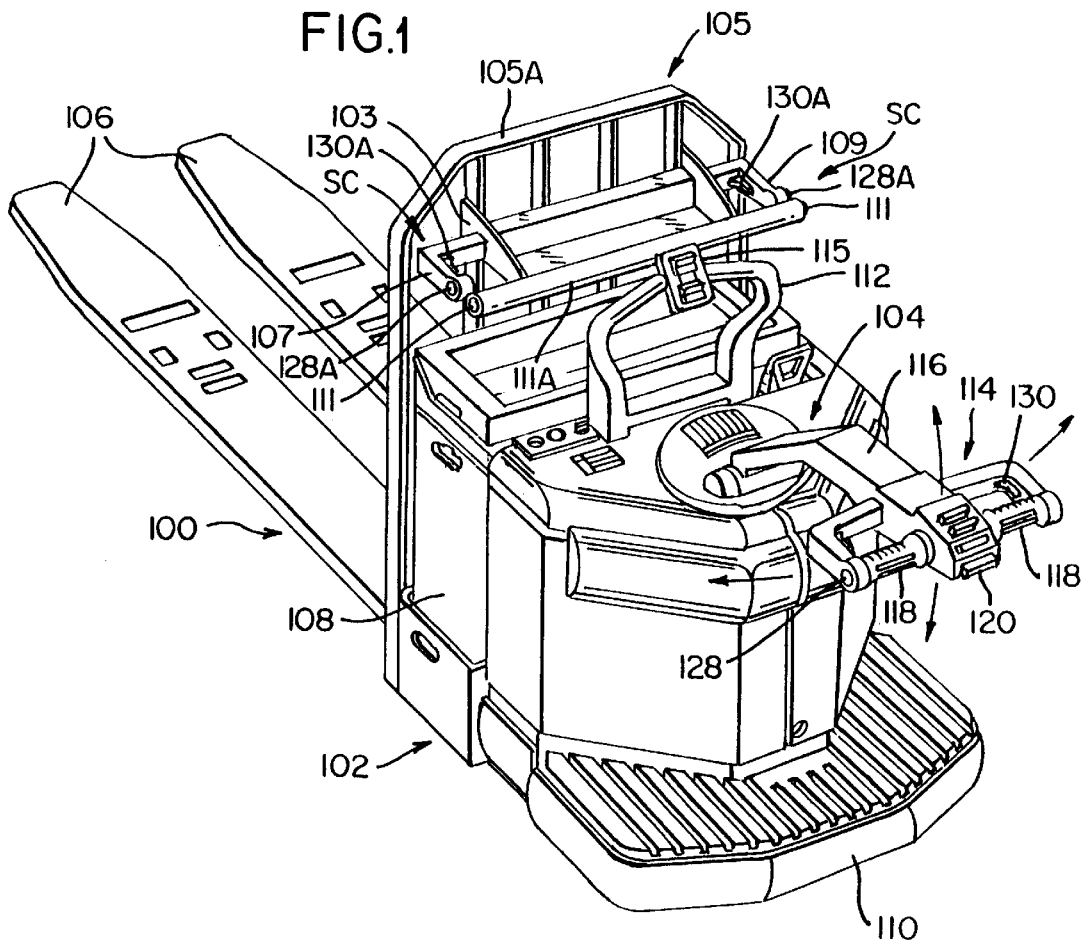
FIG. 1 is a perspective view of a walkie/rider pallet truck of the type into which the present invention is incorporated.
Figure 1A:
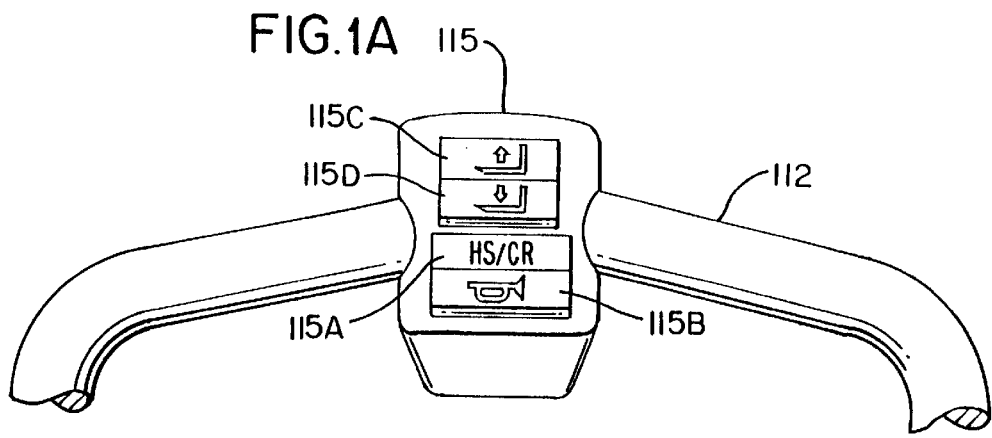
FIGS. 1A and 1B are perspective front and rear views, respectively, of a control panel mounted on a grab bar of the truck of FIG. 1.
Figure 1B:
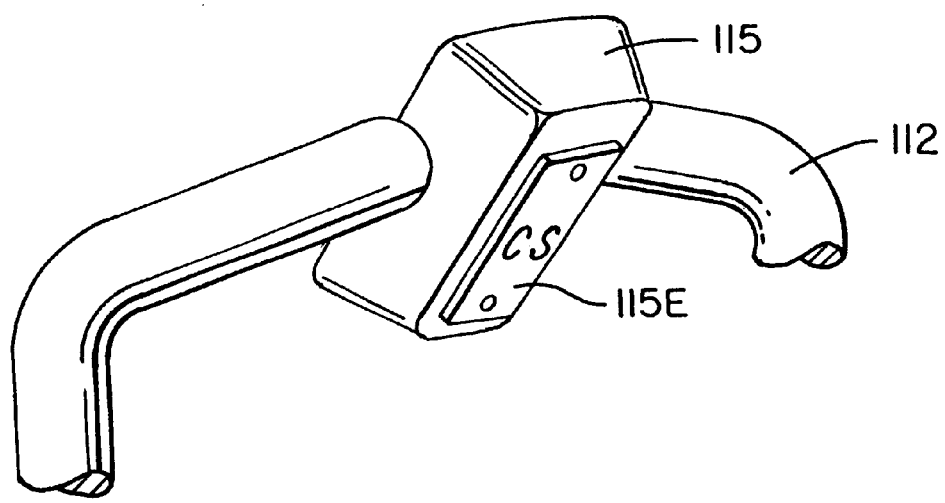

Reference will now be made to the drawings for description of the supplemental walk along control mechanism and control of the present application. In the drawings, FIG. 1 illustrates a materials handling vehicle and, more particularly, a walkie/rider pallet truck 100 including and operable in accordance with the present invention. The truck 100 includes a power unit 102, a steering control unit 104, and load carrying forks 106 that extend rearwardly from the power unit 102. The power unit 102 contains a steerable wheel (not shown), usually located directly beneath the steering control unit 104, an electric traction motor (not shown), and an electric storage battery 108. The power unit 102 also includes a platform 110 onto which an operator may step and ride while controlling the truck 100. A hand rail or grab bar 112 is provided for an operator to grip while riding on the platform 110. A control panel 115 is mounted on the grab bar 112 and includes a high speed/coast release switch (HS/CR) 115A, a horn switch 115B, a raise forks switch 115C, a lower forks switch 115D and a coast switch (CS) 115E. See FIGS. 1A and 1B.

An article support shelf 103 is mounted to a fork load backrest 105. A first handle 107 for the supplemental control SC of the present application is located on the left side of the truck 100 and, as illustrated in FIG. 1, is mounted to the article support shelf 103. A second handle 109 for the supplemental control SC of the present application is located on the right side of the truck 100 and, as illustrated in FIG. 1, is also mounted on the article support shelf 103. As will be apparent to those skilled in the art, the first and second handles 107, 109 can be mounted to other structure(s) of the truck 100, for example, they can be mounted to or on structure(s) extending from the grab bar 112, the housing for the battery 108 or other forward portions of the power unit 102. In the embodiment illustrated in FIG. 1, one of two coast release switches 111 is mounted on each side of the truck 100 with the coast release switches 111 being mounted adjacent to the first and second handles 107, 109 at opposite ends of a member 111A extending across the truck 100 and mounted to the article support shelf 103. Of course the coast release switches 111 can be mounted in a variety of locations including, for example, on the first and second handles 107, 109 as illustrated by the dashed lines in FIG. 1C that show an extension of the first handle 107 for receiving the corresponding one of the coast release switches 111. To protect the embodiment of the supplemental control SC of the present application illustrated in FIG. 1 from contact during normal use of the truck 100, it is mounted within the outer periphery 105A of the fork load backrest 105.

Figure 2:
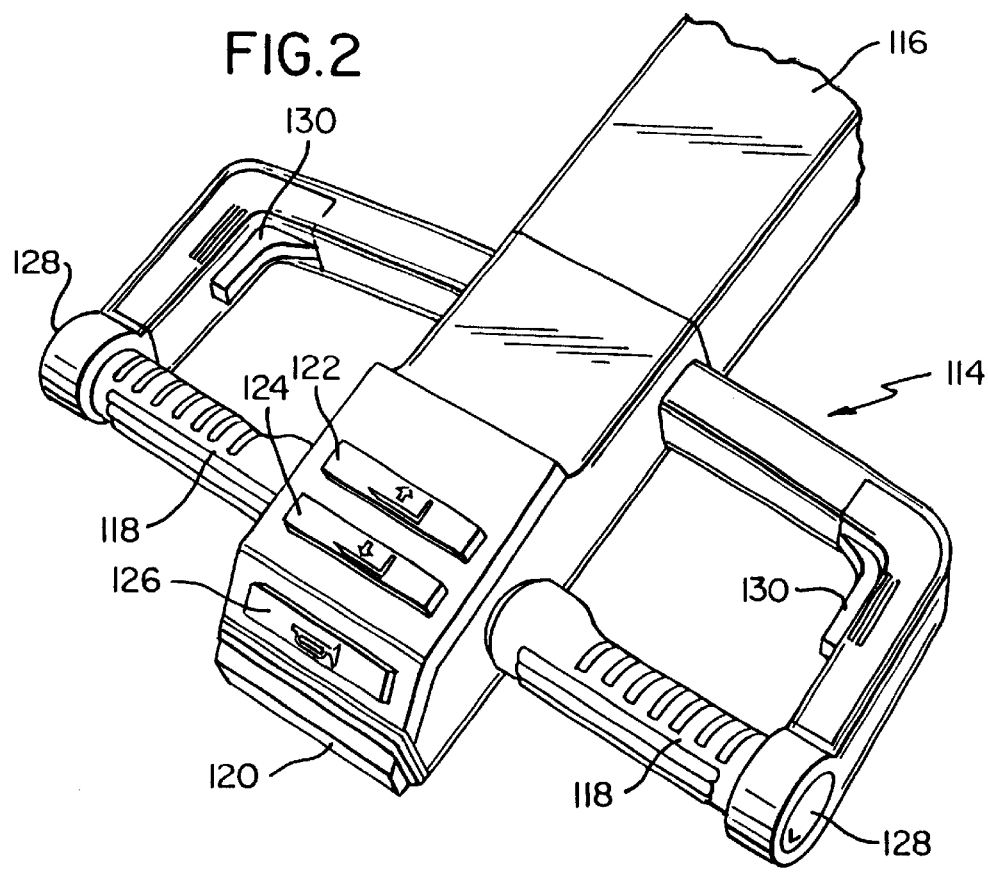
FIG. 2 is a perspective view of a control handle of the truck of FIG. 1.
Figure 3:
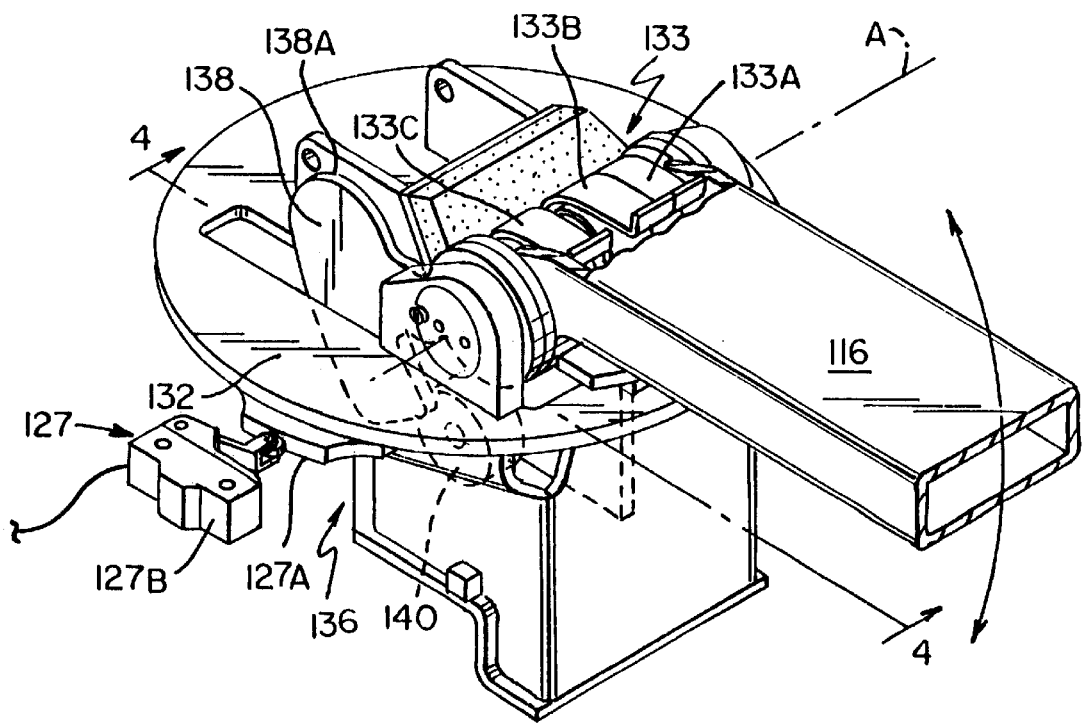
FIG. 3 is a perspective view of a portion of a steering control unit of the truck of FIG. 1 showing the pivoting movement of a steering arm of the truck and a brake deadman mechanism.

The steering control unit 104 includes a handle 114 mounted at the distal end of a steering arm 116 that is pivotally mounted to the steering control unit 104 as will be described more fully with reference to FIG. 3. The operator uses the handle 114 to control steering, braking and other truck functions. To this end, the handle 114 includes operator controls, such as twist grips 118 for controlling the direction (forward and reverse) and speed of the truck 100, a reverser switch 120, switches 122 and 124 for raising and lowering the forks 106, respectively, and a horn switch 126, see FIG. 2.

The steering arm 116 is moved from side to side to rotate the steering control unit 104 relative to the power unit 102 to determine the steered direction of the truck 100. The steering arm 116 is also used to apply a brake 117 to stop the steerable wheel, see FIGS. 6 and 7 where the steerable wheel brake 117 is shown operated and released, respectively. It will be apparent to those skilled in the art that the steerable wheel brake 117 can be constructed to directly brake the steerable wheel; to brake the traction motor driving the steerable wheel and thereby indirectly brake the steerable wheel; or, to be coupled to a transmission interconnecting the traction motor and the steerable wheel to directly brake the transmission and thereby indirectly brake the steerable wheel. Further, while a spring-loaded brake is illustrated, other braking arrangements including electrically operated and hydraulically operated brakes can be used in the present invention. All of these and any other arrangements for braking the steerable wheel will be generically referred to herein as a steerable wheel brake.

For braking the truck 100, the steering arm 116 is moved to either a generally horizontal (down) braking position within a horizontal braking arc 119 or a generally vertical (up) braking position within a vertical braking arc 121, see FIG. 5. For movement of the truck 100, the steering arm 116 is moved to a traveling, operating or driving position within a driving range or arc 123 interposed between the horizontal and vertical braking arcs 119, 121, see FIG. 5. When traveling in the power unit first or forward direction, the truck 100 will be reversed if the reverser switch 120, located at the forward part of the handle 114, is activated. The twist grips 118 are spring biased to a center neutral position. Rotating either of the grips 118 forward will cause the truck 100 to move forward at a speed proportional to the amount of rotation of the grips 118. Similarly, rotating either of the grips 118 toward the rear of the truck 100 will cause the truck 100 to move in reverse again at a speed proportional to the amount of rotation of the grips 118.

Switches that can be operated from the sides of walkie/rider truck handles, referred to as "jog" switches, can also be provided to move or jog the trucks in the power unit first or forward direction at a predetermined low speed. Jog switches 128 can be located on the outsides of the ends of the handle 114; or, jog switches 130 can be located on the insides of the ends of the handle 114. It is apparent that the jog switches 130 are better sheltered from inadvertent activation since they are protected by the handle 114. In any event, an operator walking beside a truck can move the truck by operating the jog switches on the handle 114. While either the jog switches 128 or the jog switches 130 are provided on many walkie/rider pallet trucks equipped with jog switches, another jog arrangement including both jog switches 128, 130 on each side of the handle 114, as disclosed in U.S. Pat. No. 5,245,144, is illustrated in the present application. For additional information regarding this jog switch arrangement, reference should be made to the '144 patent.

In accordance with the present invention, a supplemental control SC for walk along control of the walkie/rider pallet truck 100 is placed near the base of the load carrying forks, closely adjacent to the load backrest 105 associated with the load carrying forks 106 (or even on the load backrest 105) so that an operator can control the truck 100 from the vicinity of the base of the load carrying forks rather than having to walk to the handle 114. Using the supplemental control SC, the operator can jog the truck 100 from pick to pick in the coast mode and, when needed, can apply the steered wheel brake 117 by releasing the coast mode to enable the deadman mechanism 133 to apply the vehicle brake.

Figure 1C:
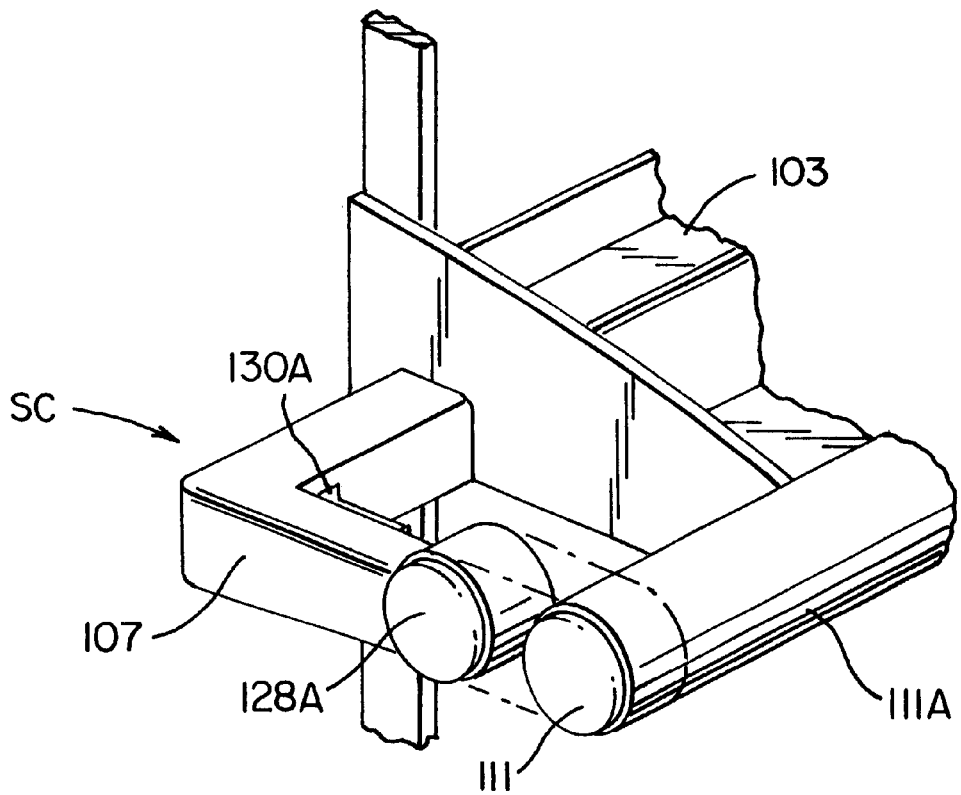
FIGS. 1C and 1D are perspective views of illustrative embodiments of the supplemental walk along control for a walkie/rider pallet truck in accordance with the present invention.

The jog controls of the supplemental control SC illustrated in FIGS. 1 and 1C are similar to those mounted on the handle 114 and include pairs of jog switches 128A and 130A in each of the handles 107, 109. Of course, a single jog switch on the inside or the outside of each of the handles 107, 109 or mounted elsewhere closely adjacent to or on the load backrest 105 can also be used in the present invention. The jog switches 128A and 130A are enabled only when the truck 100 is in the coast mode. When the truck 100 is in the coast mode and the truck is operated from the jog switches 128A and 130A, an operator can apply the vehicle brake by pressing one of the coast release switches 111 to release coast thereby enabling the brake deadman mechanism 133 to move the steering arm 116 to its up braking position and brake the truck 100.

Figure 1D:
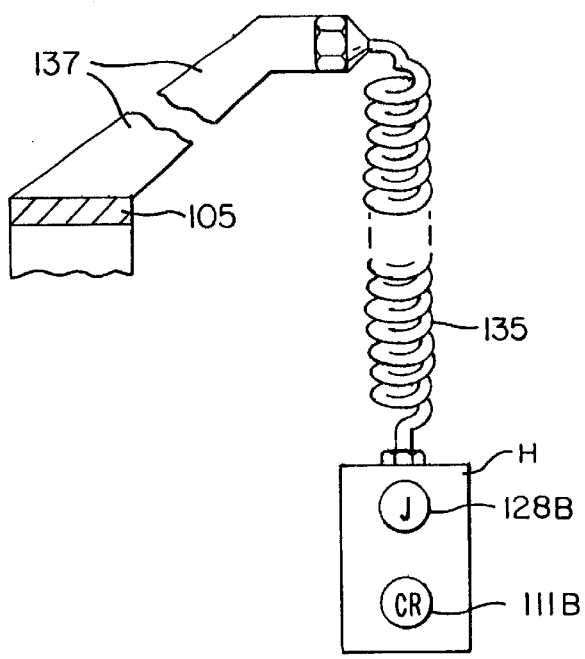

Another embodiment, shown in FIG. 1D, includes a single jog switch 128B and a single coast release switch 111B mounted in a housing H which can be movably positioned to either side of the truck 100. The housing H, with the jog switch 128B and the coast release switch 111B mounted therein, is secured to the end of a coiled tether 135 which is supported by an arm 137 mounted to the load backrest 105. Other alternative arrangements of the supplemental control SC will be apparent to those skilled in the art from the disclosure of the present application.

The jog switches 128A, 130A, 128B are used when an operator is moving along a substantially straight portion of a pick route and so should be activated when the steering arm is directed substantially straight ahead. To ensure that the truck 100 is not moved by the jog switches 128A, 130A, 128B when the truck is steered to one side or the other, a steering direction detector 127 is provided to enable movement of the truck 100 using the jog switches 128A, 130A, 128B only when the steered wheel of the truck 100 is directed substantially straight ahead. The steering direction detector 127 can provide an input to a controller 142 of the truck 100 or can be coupled directly to the jog switches 128A, 130A, 128B to enable movement of the truck 100 using the jog switches 128A, 130A, 128B only when the steered wheel of the truck 100 is directed substantially straight ahead. In the illustrated embodiment, the steering direction detector 127 comprises a cam 127A mounted to and movable with the steering head 132 and a switch 127B mounted to the power unit 102, see FIG. 3, and provides a "straight ahead" steering signal while the steered wheel is within a steering sector of approximately 10° i.e., ±5° from straight ahead. Of course other steering sector angles can be used as desired, the switch 127B can be mounted to the steering head 132 and the cam 127A to the power unit 102 and other steering direction detectors such as encoders, potentiometers and the like can be used in the present invention.

Figure 6:
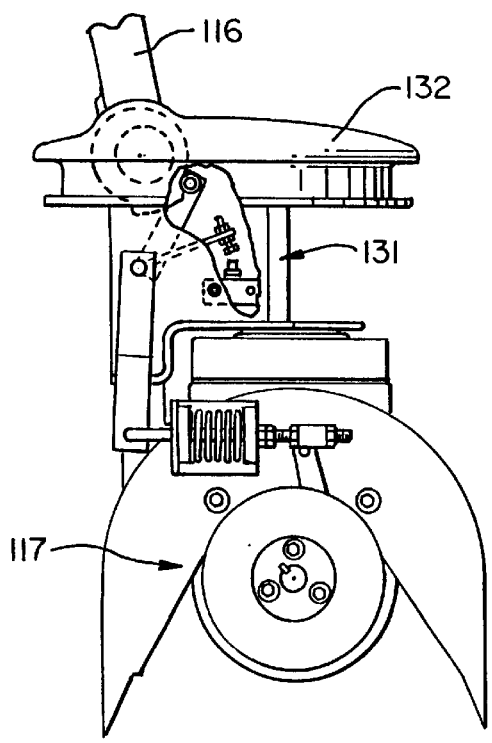
FIGS. 6 and 7 illustrate a steered wheel brake in the operated and non-operated positions, respectively.
Figure 7:
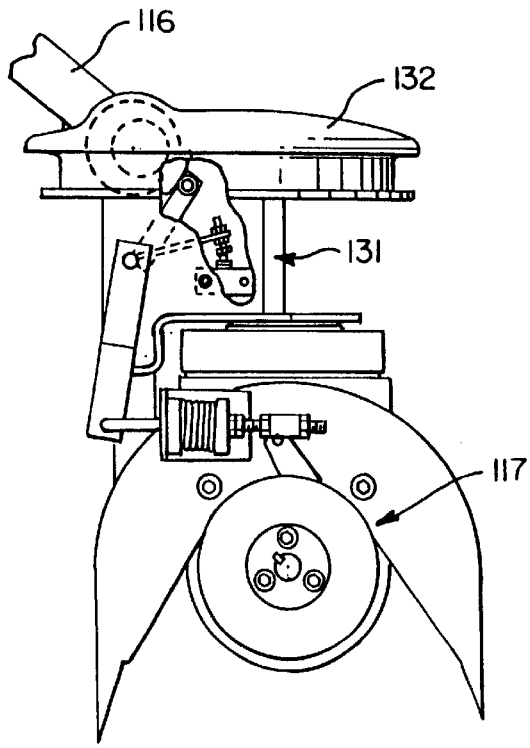

When the steering arm 116 is moved into the horizontal braking arc 119 or the vertical braking arc 121, a switch 131 cuts power to the electric traction motor and actuates the steerable wheel brake 117 to stop the truck 100, see FIGS. 6 and 7. The vehicle brake can, thus, be engaged manually by the operator forcing the arm 116 to a braking position (the up braking position or the down braking position) or, if the operator releases the arm 116, by operation of a brake deadman mechanism 133 that automatically drives the arm 116 into its up braking position. The deadman mechanism 133 is illustrated as that provided on Walkie/Rider Pallet Trucks commercially available from the Crown Equipment Corporation, assignee of the present application, and comprises three torsion springs 133A, 133B and 133C which are coupled between a steering head 132 and the steering arm 116 as shown in FIG. 3. Three torsion springs are provided to facilitate production of the springs and so that a variety of spring forces can be easily selected for varying weight steering arm/handle combinations by selection of the torsion springs. Operation of the deadman mechanism 133 may be prevented by a deadman override device that allows the vehicle to operate in a coast mode.

Overriding the deadman mechanism 133 for coast operation of the walkie/rider pallet trucks 100 will now be described with reference to FIGS. 3 and 4 which illustrate a relevant portion of the steering control unit 104 of the truck 100 of FIG. 1. The steering arm 116 is mounted to a steering head 132 for pivotal movement about an axis A and is spring biased into a generally vertical braking position within the vertical braking arc 121, i.e., the up braking position, by a torsion spring force generated by the torsion springs 133A–133C that form the brake deadman mechanism 133 for the illustrated embodiment. Thus, when the handle 114 is released by an operator, the springs 133A–133C raise the steering arm 116 to brake the truck 100. Of course, other brake deadman mechanisms can be used in the present invention, for example, the deadman mechanism disclosed in U.S. Pat. No. 5,964,313.

To provide coast control for the truck 100, a locking device 136 locks the steering arm 116 into any selected position, at least within the driving arc 123, so that the brake deadman mechanism 133 is overridden and prevented from moving the steering arm 116 into its generally vertical, up braking position. While the locking device 136 applies a locking force to the steering arm 116 that overcomes the brake deadman mechanism 133 to fix the steering arm's 116 position, the locking force is selected such that it can be overcome by the operator of the truck 100 for moving the steering arm 116 to manually apply the steerable wheel brake 117 and also for moving the steering arm 116 to other selected locations where the locking device 136 will again retain the steering arm 116. As illustrated, the locking device 136 comprises a steering arm brake; however, other locking devices can be used including, for example, detented or segmented locks wherein a tab can be selectively engaged into one of a plurality of opposing detents to define a corresponding number of locked positions as well as a variety of steering arm brake arrangements in addition to that illustrated.

When the illustrated steering arm brake is used as the locking device 136, it provides a virtually limitless number of positions within the vertical movement range of the steering arm 116 into which the steering arm 116 can be locked as opposed to a defined number of positions for a locking device relying on detents or segments that define discrete locking positions. In FIGS. 3 and 4, the steering arm brake comprises an armature plate 138 and an electromagnet 140 with the brake being engaged by activation of the electromagnet 140 to attract the armature plate 138.

The armature plate 138 is connected to the steering arm 116 and is moved through an arc 139 as the steering arm 116 is moved between its down braking position and its up braking position. In FIG. 4, the armature plate 138 is shown in solid lines when the steering arm 116 is in its down braking position, is shown in dotted lines when the steering arm 116 is in its up braking position and can be positioned anyway between these two extremes as the steering arm 116 is moved between the down braking position and the up braking position. The armature plate 138 can be made from low carbon steel, such as grades 1008 through 1035, and be nickel plated to a thickness of between 0.0007 and 0.0010 of an inch to prevent corrosion and give a smooth surface that reduces noise as the armature plate 138 slides over the electromagnet 140. Of course, other materials and material finishes can be used for the armature plate 138 as will be apparent to those skilled in the art.

Figure 4A:
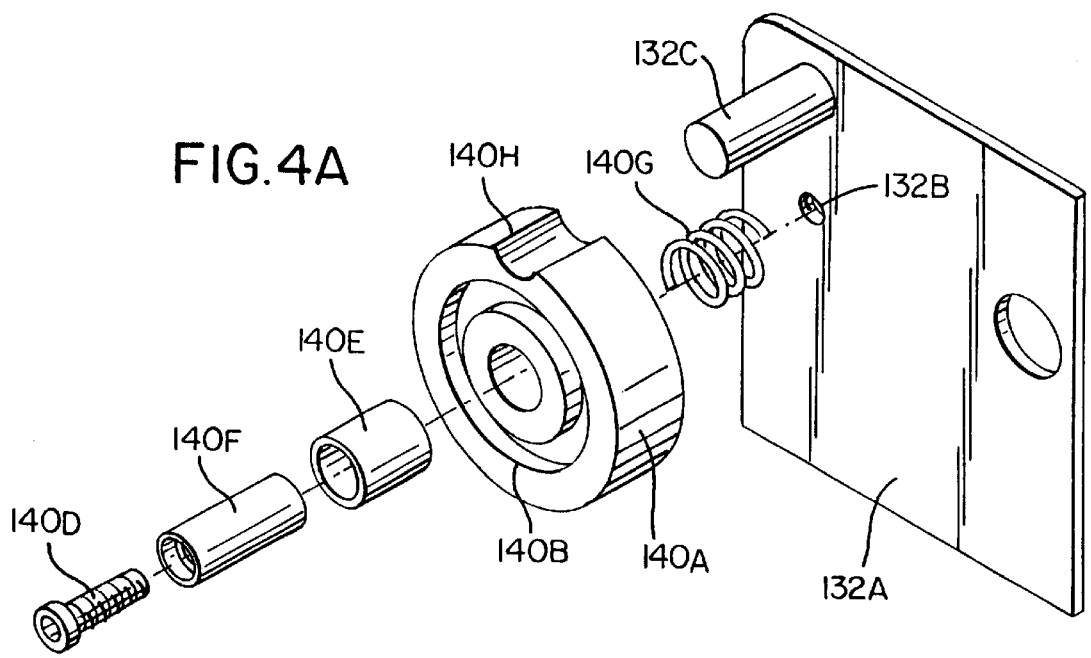
FIG. 4A is a partially sectioned side view showing resilient biasing of an electromagnet of a steering arm brake into an armature plate of the brake.
Figure 4B:
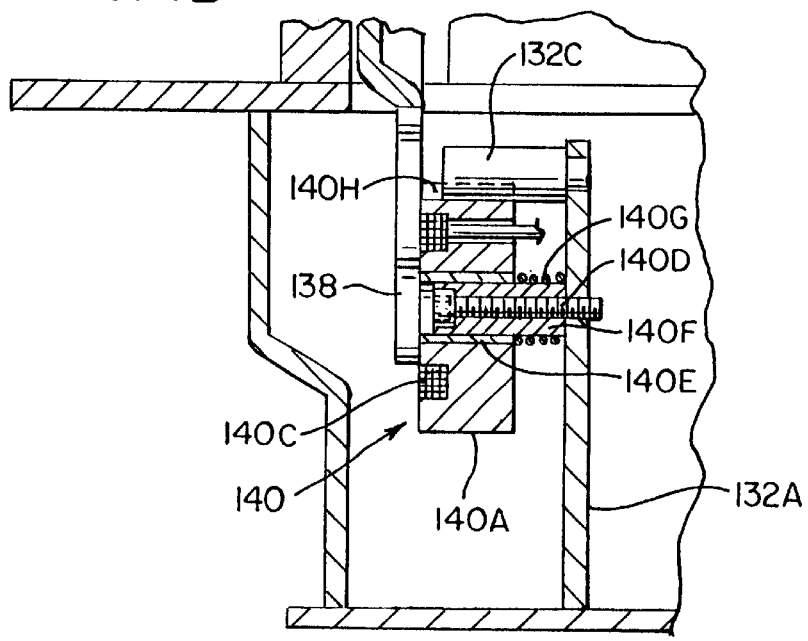
FIG. 4B is a partially sectioned view of the steering arm brake taken along the section line 4B—4B of FIG. 4.

The electromagnet 140 includes a solid body 140A having an annular groove 140B formed in its forward surface (the face or surface facing the armature plate 138) for receiving an electrical coil 140C which is electrified to activate the electromagnet 140, see FIGS. 4, 4A and 4B. The electromagnet 140 is supported on a plate 132A connected to the front portion of the steering head 132. A socket head cap screw 140D engages a threaded aperture 132B in the plate 132A to secure a mounting pin 140F to the plate 132A. A bushing 140E is pressed into the solid body 140A of the electromagnet 140 with the mounting pin 140F sized to be received within the bushing 140E. In the illustrated embodiment, the electromagnet 140 is mounted for axial movement relative to the plate 132A and is spring biased away from the plate 132A and into engagement with the armature plate 138 by means of a compression spring 140G.

The compression spring 140G surrounds the mounting pin 140F, extends between the solid body 140A and the plate 132A, and provides an appropriate outward force to the solid body 140A, for example, a force of about ½ pound, see FIGS. 4A and 4B. By spring biasing the electromagnet 140 into the armature plate 138, the distance between the two is maintained to accommodate tolerance build up in the pivotal mounting of the steering arm 116 to the steering head 132 and to ensure consistent magnetic forces when the brake is applied. The body 140A of the electromagnet 140 is prevented from rotating about its axis by a notch 140H in the solid body 140A which receives a pin 132C extending from the plate 132A. In the illustrated embodiment, the solid body 140A is retained on the mounting pin 140F against the force of the compression spring 140G by its engagement with the armature plate 138.

The body 140A of the electromagnet 140 can be made from cold finished steel that has a Salt Bath Nitriding (SBN) finish produced by a ferritic nitrocarburising process that adds both nitrogen and carbon to the ferrous surface of the body 140A. The nitrogen and carbon atoms form a compound layer in the surface and a deep diffusion zone beneath the layer that ranges between approximately 0.0002 and 0.0008 of an inch and that has a hardness of approximately Rockwell C 58 to 60. The surface layer increases corrosion protection, provides lubricating properties for the body and resists abrasive wear between sliding surfaces. The surface layer is also nonmagnetic and provides a nonmagnetic gap, functionally similar to an air gap, between the electromagnet 140 and the armature plate 138 to prevent sticking due to residual magnetism. It is noted that other electromagnet body materials and material finishes can be used as will be apparent to those skilled in the art.

An alternative construction for the electromagnet 140 that may provide longer life is provided by having a friction surface 140B' on the forward face of the electromagnet 140 in place of the SBN finish, see FIG. 4C. The friction surface 140B' is made of a friction material to give a long life wearing surface. One material that can be used is Bremskerl #4199, a synthetic rubber-resin bonded material used in electromagnetic brakes and clutches, of course other known friction materials can be used as will be apparent to those skilled in the art. To ensure the distance between the electromagnet 140 and the armature plate 138 is maintained for consistent magnetic forces when the brake is applied, the friction material is located on top of the electrical coil 140C and is flush with the forward face of the electromagnet 140.

A changing portion of an inner surface 138A of the armature plate 138 is positioned against the electromagnet 140 as the armature plate 138 moves through the arc 139 as the steering arm 116 is moved through the horizontal braking arc 119, the driving arc 123 and the vertical braking arc 121. As shown in FIG. 4, a portion of the armature plate 138 is always against the electromagnet 140 throughout the travel range of the armature plate 138 even though the surface area of the armature plate 138 contacting the electromagnet 140 is reduced to minimums at the ends of the travel range of the armature plate 138 and the steering arm 116.

During movement of the steering arm 116 within the driving arc 123, the electromagnet 140 is substantially fully covered by corresponding portions of the armature plate 138. Thus, the braking force exerted by activation of the electromagnet 140 is assured to lock the steering arm 116 in the position within the driving arc 123 that the steering arm 116 occupies when the electromagnet 140 is activated or in a subsequent position within the driving arc 123 to which the steering arm 116 is moved while the electromagnet 140 is activated. Locking within the horizontal braking arc 119 and the vertical braking arc 121 is not assured; however, locking at any position within the vertical range of motion of the steering arm 116 can be assured by enlargement of the armature plate 138 so that the electromagnet 140 is fully covered at all positions of the armature plate 138 within its travel range, i.e., the arc 139.

As noted above, the braking force is selected so that the steering arm 116 is fixed and not moved by the brake deadman mechanism 133. However, the force can be overcome by an operator to manually apply the steerable wheel brake 117 or to reposition the steering arm 116. To move the steering arm 116, an operator must apply a force greater than the difference between the restraining force or torque generated by the electromagnet 140 and the force or torque applied by the deadman mechanism 133, i.e., the springs 133A–133C. It is currently believed that if the required operator force is set to a value which prevents movement of the steering arm 116 in response to the truck 100 going over bumps of a common size in the floor that it will be acceptable to all operators of the truck. This force can be increased or reduced for given applications and to accommodate given operators as long as the force is adequate to ensure proper coasting operation of the truck 100. In one embodiment of the truck 100, the proper forces/torques were obtained by using an electromagnet that generated an attractive force of approximately seventy (70) pounds.

To confirm operation of the coast system to the operator of the truck 100, two types of operator feedback can be used. The first alerts the operator when the coast switch 115E has been operated and that power is applied to the electrical coil 140C of the electromagnet 140; and the second indicates to the operator that the coast mode is active.

The first feedback is an audible signal (although both an audible signal and a visual signal can be used) indicating operation of the coast switch 115E. It alerts the operator if the coast switch 115E is pressed inadvertently, confirms that the switch 115E is working properly, and confirms that power is applied to the electrical coil 140C of the electromagnet 140 when the coast switch 115E is pressed. For example, a one-shot audible signal alarm (not shown) can be connected across the electrical coil 140C and is powered when the electromagnet 140 is powered. Because a one-shot signal generator is used, the tone only sounds for a brief period of time when power is first applied. Such devices are commercially available from a number of companies such as Floyd Bell, Inc. and can be customized for a given application by means of integral electronics to generate a variety of different sounds such as a chime sound, a single tone "beep" or the like. The devices match the operating voltage of the system and emit the sound for a required period of time. Continuous chime models, such as model no. MC-05-530-P from Floyd Bell, Inc. and model no. SBM428 from the Mallory Electronic Component division of North America Capacitor Company, can also be used with an external electronic driver to provide the same functionality as the one-shot signal generator.

The second feedback is a visual indication (although both a visual signal and an audible signal can be used) to alert the operator that the coast mode is active. The indication can be of various types such as a warning light or a mechanical warning device triggered when power is applied to the electrical coil 140C. A warning light could be turned on continuously or be a flashing light. The light can be used in conjunction with an adjacent label or could back-light a label. A mechanical warning device could open a shutter or window to allow a warning to be displayed. An audible alarm could also be sounded if some condition was met (e.g. if the truck 100 has the coast mode selected and is restarted after sitting idle for more than 5 minutes). These as well as a large variety of other feedback devices and arrangements will be suggested to those skilled in the art from the present description.

Control of the deadman brake override system described above (or any other deadman brake override or coast control system) and the supplemental walk along control as described above is incorporated into the controller 142 of the truck 100. See FIG. 8 which is a schematic block diagram of a portion of the control system for the truck 100 wherein normally open contacts are indicated by an "X" and normally closed contacts are indicated by a "I". In a working embodiment of the present invention, the controller 142 is a Sevcon Millipak controller for separately excited motors (SEM) that includes microprocessor control, however, a variety of other controllers can be used in the present invention. Inputs to the controller 142 include the parallel combination of the high speed/coast release switch 115A and the coast release switches 111, 111B, the coast switch 115E, the twist grips 118, the jog switches 128, 130, 128A, 130A, 128B and the steering direction detection switch 127B. Movement of the truck 100 is enabled by a brake switch 144 which is connected to the reverser switch 120. If the reverser switch 120 is not activated, reverse switch 146 and forward switch 148 are enabled so that the direction of travel of the truck 100 is determined by which of the switches 146 and 148 is activated. If the reverser switch 120 is activated, the switches 146 and 148 are disabled and a signal to reverse the truck 100 is sent to the controller 142.

If an operator of the truck 100 operates both jog switches 128, 130 on either side of the handle 114, the truck 100 is accelerated to walking speed in the forward direction. If the truck 100 is in the coast mode of operation so that the brake switch 144 is closed and the operator of the truck 100 operates both of the jog switches 128A, 130A on the handles 107, 109, or the jog switch 128B in the housing H, the truck 100 is accelerated to walking speed in the forward direction provided that the steering direction detection switch 127B is closed indicating that the steered wheel of the truck 100 is directed substantially straight ahead. The steering direction detection switch 127B is shown in solid lines as being connected directly to the jog switches 128A, 130A, 128B; however, its steering direction signal could be directly coupled to the controller 142 and used by the controller 142 to determine whether to enable the jog switches 128A, 130A, 128B which would then be directly connected to the controller 142 as illustrated by dotted line connections in FIG. 8.

Figure 9:
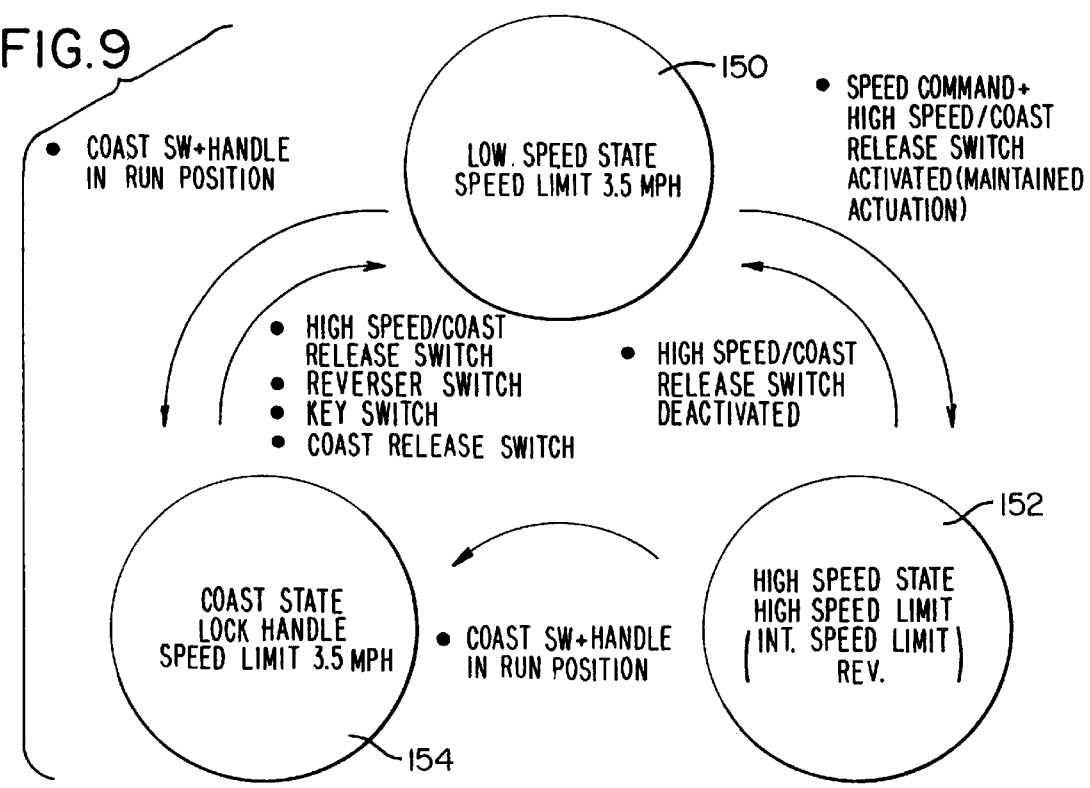
FIGS. 9 and 10 are state diagrams used by the controller of FIG. 8 to operate the truck of FIG. 1.
Figure 10:
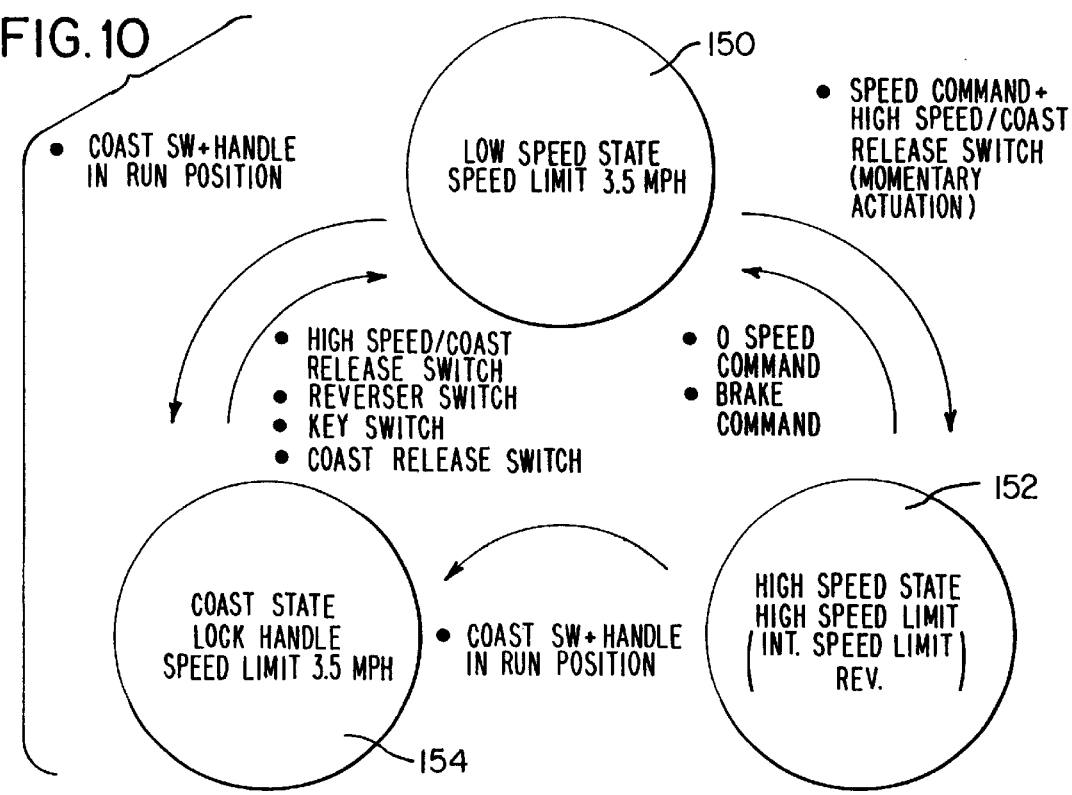

FIGS. 9 and 10 illustrate state diagrams which are used by the controller 142 to operate the truck 100. In FIG. 9, high speed operation of the truck 100 is enabled by continuous activation of the high speed/coast release switch 115A, i.e., the operator must hold the high speed/coast release switch 115A in its operated position. In FIG. 10, high speed operation of the truck 100 is enabled by momentary activation of the high speed/coast release switch 115A while a speed command is provided, i.e., while the operator maintains either of the twist grips 118 out of their neutral positions. Each of the state diagrams include the same three states: a low speed state 150; a high speed state 152; and, a coast state 154. In the low speed state 150, the speed of the truck 100 is limited to a low speed, for example a walk speed of approximately 3.5 miles per hour (mph) (5.6 kilometers per hour (km/hr)). In the high speed state 152, the truck 100 can be operated: at speeds up to an intermediate speed, greater than the low speed, in the forks first or reverse direction; and, at speeds up to a high speed, greater than the intermediate speed, in the power unit 102 first or forward direction. In the coast state 154, the speed of the truck 100 is limited to a low speed that normally would be the same as the limited low speed of the low speed state 150.

The controller 142 enters the low speed state 150 at key on of the truck 100, i.e., when the truck key is moved from off to on, so that the truck 100 can then be operated at the limited low speed by operation of the twist grips 118 and/or the jog controls, if provided, such as the jog switches 128 or 130 (or both the jog switches 128 and 130) or the jog switch 128B. The high speed state 152 can be entered from the low speed state 150 by activating either of the twist grips 118 to generate a speed command (other than zero provided at the neutral position of the twist grips 118) and activation of the high speed/coast release switch 115A. For operation in accordance with the state diagram of FIG. 9, for the truck 100 to be maintained in the high speed state 152, the high speed/coast release switch 115A must remain activated. To relieve the operator of the truck 100 from having to hold the high speed/coast release switch 115A to maintain operation of the truck 100 in the high speed state 152, which is objectionable to some operators, operation of the truck 100 in the high speed state 152 is maintained after the high speed/coast release switch 115A is momentarily made and then released in the state diagram of FIG. 10. While in the high speed state 152, the truck can be operated at speeds up to either the intermediate speed or the high speed, depending upon the direction of movement of the truck, by means of the twist grips 118.

The low speed state 150 is entered from the high speed state 152 by releasing the high speed/coast release switch 115A for the state diagram of FIG. 9. For the state diagram of FIG. 10, the low speed state 150 is entered from the high speed state 152 by movement of the twist grips 118 into their central neutral positions to generate a zero (0) speed command or by application of the steerable wheel brake 117.

In the coast state 154, the speed of the truck 100 is limited to a low speed, such as walk speed, as previously noted. Also, entry into the coast state 154 activates the locking device 136, by engaging the electromagnet 140 in the illustrated embodiment, so that the steering arm 116 is locked into its then current position (or into a position to which it is subsequently moved while in the coast state 154). The coast state 154 is entered from either the low speed state 150 or the high speed state 152 by activation of the coast switch 115E with the steering arm 116 in the truck run position, i.e., within the driving arc 123. While a single coast switch, i.e., the coast switch 115E, is illustrated as being mounted on the back of the control panel 115, the coast switch 115E can be mounted elsewhere on the grab bar 112 or closely positioned to the grab bar 112. Alternately, two coast switches can also be used, one mounted on either side of the control panel 115 or at other locations on the grab bar 112 or otherwise associated with or closely positioned to the grab bar 112.

When in the coast state 154, if the high speed/coast release switch 115A is activated or the reverser switch 120 is activated or one of the two coast release switches 111 is activated or the coast release switch 111B is activated or the key is switched off and then back on, the controller 142 enters the low speed state 150. For the controller 142 to enter the high speed state 152 from the coast state 154, it first enters the low speed state 150 from which it can go to the high speed state 152 if the high speed/coast release switch 115A is activated and a nonzero speed command is received from the twist grips 118, i.e., either of the twist grips 118 is moved out of its central neutral position.

With the understanding of the present invention gained from the above description of the novel supplemental walk along control for walkie/rider pallet trucks, operation of the truck 100 using the present invention will now be described. When an operator of the walkie/rider pallet truck 100 keys on the truck 100, the controller 142 comes up in the low speed state 150 so that the operator can move the truck 100 at speeds up to the limited low speed for the truck 100 by operation of the twist grips 118 or by activation of jog switches 128, 130, 128A, 130A, 128B if provided on a given truck. Once the truck 100 is keyed on, the operator proceeds with stock picking operations by moving the truck 100 along a prescribed route through a warehouse picking up stock in a predetermined sequence.

If the operator's first pick is a good distance from where the truck is keyed on, the operator steps onto the platform 110, grips the grab bar 112 immediately adjacent to the control panel 115 mounted on the grab bar 112, operates (continuously or momentarily) the high speed/coast release switch 115A and moves one of the twist grips 118 to accelerate the truck 100 toward the first pick. These operations advance the controller 142 from the low speed state 150 to the high speed state 152 so that the truck 100 can be operated in the power unit first or forward direction at speeds up to the high speed for the truck 100. Upon approaching the first pick, the operator moves the twist grip 118 to slow the truck 100 for the pick. Upon releasing the high speed/coast release switch 115A or moving the twist grip 118 to its central neutral position, the controller 142 is placed into the low speed state 150.

As the truck 100 approaches the first pick, the operator stops the truck 100 and steps from the platform 110. If the operator wants to coast the truck 100 to the first pick, he/she then activates the coast switch 115E to place the controller 142 into the coast state 154 so that the steering arm 116 is locked into the position at which the coast switch 115E was operated by activation of the electromagnet 140 (or other locking device). The operator then moves to the item to be picked, picks up the item and turns around as the truck 100 coasts into a position so that a pallet on the load forks 106 of the truck 100 (or other load support device on the forks 106 or provided in place of the load forks 106) is in position for the operator to place the picked item thereon. The operator then advances the truck 100 to the next pick. In accordance with the present invention, if the next pick is close by and located along a substantially straight portion of the pick route, the operator need only advance to the base of the load carrying forks 106 and activate the jog switches 128A and/or 130A or the jog switch 128B to accelerate the truck to walking speed if the steered wheel is detected by the steering direction detector 127 to be directed substantially straight ahead as should be the case for travel along a substantially straight portion of the pick route. Again, as the operator approaches the pick, he/she coasts the truck 100 to an appropriate position to place the pick onto the pallet on the forks 106 or other load support device of the truck 100. If the operator needs to brake the truck 100, he/she activates one of the coast release switches 111, 111B to move from the coast state to the low speed state thereby enabling the brake deadman mechanism 133 to move the steering arm 116 to its up braking position to brake the truck 100.

If the next pick is some distance away, for example twenty or more feet, the operator may choose to move to the handle 114 where he/she steps onto the platform 110 and rides the truck 100 to the next pick location. The operator would then engage the high speed/coast release switch 115A to release the coast control and place the controller 142 into the low speed state 150. The activation of the high speed/coast release switch 115A together with a nonzero speed command from the twist grips 118 moves the controller 142 through the low speed state 150 into the high speed state 152 so that the operator can move the truck 100 at speeds up to the high speed for the truck 100 to more rapidly advance to the next pick location. Upon approaching the next pick location, the operator would stop the truck 100 and step from the platform 110. Presuming that the operator again wants to coast the truck 100 to the pick, the operator then manually actuates the coast switch 115E to place the controller 142 into the coast state 154 so that the steering arm 118 is locked into the position within the driving arc 123 at which the coast switch was operated by activation of the electromagnet 140 (or other locking device).

It is, thus, apparent that operation of the truck 100 for stock picking applications is improved since the coast mode of operation can be conveniently engaged by manual operation of the coast switch 115E mounted on or near the grab bar 112 and operation of the truck in the coast state can be performed from a position substantially adjacent to the base of the load carrying forks 106 for a plurality of picks located along a substantially straight portion of a pick route.

Having thus described the invention of the present application in detail and by reference to preferred embodiments thereof, it will be apparent that modifications and variations are possible without departing from the scope of the invention defined in the appended claims.

What is claimed is:

1. A supplemental control for a walk along materials handling vehicle comprising:
    at least one jog switch mounted on each side of said vehicle adjacent a rear of a power unit of said vehicle at a base end of load carrying forks of said vehicle, said at least one jog switch being actuated to move said vehicle when a coast mechanism of said vehicle is activated; and
    a coast release switch mounted on each side of said vehicle adjacent said rear of said power unit at said base end of said load carrying forks, said coast release switch being actuated to release said coast mechanism and thereby apply a steerable wheel brake.

2. A supplemental control for a walk along materials handling vehicle as claimed in claim 1 further comprising a steering direction detector to enable movement of said vehicle in response to actuation of said at least one jog switch only when a steered wheel of said vehicle is directed substantially straight ahead.

3. A supplemental control for a walk along materials handling vehicle as claimed in claim 2 wherein said steering direction detector comprises a cam and a switch operated by said cam, said cam and said switch being coupled between a power unit of said vehicle and a steering arm of said vehicle.

4. A supplemental control for a walk along materials handling vehicle as claimed in claim 3 wherein said cam is coupled to said steering arm and said switch is coupled to said power unit.

5. A supplemental control for a walk along materials handling vehicle as claimed in claim 3 wherein said steering direction detector is coupled to said at least one jog switch.

6. A supplemental control for a walk along materials handling vehicle as claimed in claim 1 further comprising a first handle mounted on a left side of said vehicle and a second handle mounted on a right side of said vehicle, and wherein each of said at least one jog switch is mounted in one of said first and second handles.

7. A supplemental control for a walk along materials handling vehicle as claimed in claim 6 wherein said coast release switches are mounted on said first and second handles.

8. A supplemental control for a walk along materials handling vehicle as claimed in claim 6 wherein said coast release switches are mounted adjacent to said first and second handles.

9. A supplemental control for a walk along materials handling vehicle as claimed in claim 8 wherein said coast release switches are mounted at opposite ends of a member extending across said vehicle, said member being mounted adjacent to said first and second handles.

10. A supplemental control for a walk along materials handling vehicle as claimed in claim 6 wherein each of said first and second handles includes two jog switches which are operated simultaneously to move said vehicle.

11. A supplemental control for a walk along materials handling vehicle as claimed in claim 6 wherein said materials handling vehicle includes an article support shelf mounted to said vehicle and said first and second handles are mounted to said article support shelf.

12. A supplemental control for a walk along materials handling vehicle as claimed in claim 11 wherein said article support shelf is mounted to a fork load backrest of said vehicle.

13. A supplemental control for a walk along materials handling vehicle as claimed in claim 11 wherein said coast release switches are mounted adjacent to said first and second handles.

14. A supplemental control for a walk along materials handling vehicle as claimed in claim 13 wherein said coast release switches are mounted at opposite ends of a member extending across said vehicle.

15. A supplemental control for a walk along materials handling vehicle as claimed in claim 14 wherein said member is mounted to said article support shelf.

16. A supplemental control for a walk along materials handling vehicle as claimed in claim 1 wherein said supplemental control is sized to be within an outer periphery of a fork load backrest of said vehicle.

17. A supplemental control for a walk along materials handling vehicle as claimed in claim 16 wherein said supplemental control is coupled to said fork load backrest.

18. A method for operating a walk along materials handling vehicle comprising the steps of:
    providing at least one jog switch on each side of said vehicle adjacent a rear of a power unit of said vehicle at a base end of load carrying forks of said vehicle;
    providing a coast release switch located adjacent to said at least one jog switch on each side of said vehicle;
    actuating said at least one jog switch to move said vehicle when a coast mechanism of said vehicle is activated; and actuating said coast release switch to release said coast mechanism of said vehicle and thereby brake said vehicle.

19. A method for operating a walk along materials handling vehicle as claimed in claim 18 further comprising the step of enabling movement of said vehicle in response to actuation of said at least one jog switch only when said steered wheel is directed substantially straight ahead.

20. A method for operating a walk along materials handling vehicle as claimed in claim 19 wherein said step of enabling movement of said vehicle in response to actuation of said at least one jog switch only when said steered wheel is directed substantially straight ahead comprises the steps of:

providing a steering direction detector;

monitoring said steering direction detector to determine when said vehicle is steered substantially straight ahead; and enabling movement of said vehicle in response to said at least one jog switch only when said steering direction detector indicates that said steered wheel is directed substantially straight ahead.

21. A method for operating a walk along materials handling vehicle as claimed in claim 20 wherein said step of providing a steering direction detector comprises the step of coupling a cam and switch between a power unit of said vehicle and a steering arm of said vehicle.

22. A method for operating a walk along materials handling vehicle as claimed in claim 21 wherein said step of coupling a cam and a switch between a power unit of said vehicle and a steering arm of said vehicle comprises the steps of:

coupling said cam to said steering arm; and coupling said switch to said power unit.

23. A supplemental control for a walk along materials handling vehicle including load carrying forks, a steerable wheel, a steerable wheel brake coupled to said wheel, a steering arm coupled to said wheel for steering said wheel and also being movable through an arc including a driving arc interposed between a substantially vertical braking position and a substantially horizontal braking position, a handle on said steering arm for control of said vehicle, a deadman mechanism for said steerable wheel brake to move said steering arm into said vertical braking position to brake said vehicle when said handle is released and a coast mechanism for selectively disabling said deadman mechanism, said supplemental control comprising:

at least one jog switch mounted on each side of said vehicle adjacent a rear of a power unit of said vehicle at a base end of said load carrying forks, said at least one jog switch being actuated to move said vehicle when said coast mechanism is activated; and a coast release switch mounted on each side of said vehicle adjacent said rear of said power unit at said base end of said load carrying forks, said coast release switch being actuated to release said coast mechanism to apply said steerable wheel brake.

24. A method for operating a walk along materials handling vehicle including load carrying forks, a steerable wheel, a steerable wheel brake coupled to said wheel, a steering arm coupled to said wheel for steering said wheel and also being movable through an arc including a driving arc interposed between a substantially vertical braking position and a substantially horizontal braking position, a handle on said steering arm for control of said vehicle, a deadman mechanism for said steerable wheel brake to move said steering arm into said vertical braking position to brake said vehicle when said handle is released and a coast mechanism for selectively disabling said deadman mechanism, said method comprising the steps of:

providing at least one jog switch on each side of said vehicle adjacent a rear of a power unit of said vehicle at a base end of said load carrying forks;

providing a coast release switch located closely adjacent to said at least one jog switch on each side of said vehicle;

actuating said at least one jog switch to move said vehicle when said coast mechanism is activated; and actuating said coast release switch to release said coast mechanism and brake said vehicle via said deadman mechanism.

25. A supplemental control for a walk along materials handling vehicle comprising:

at least one jog switch positioned adjacent a rear of a power unit of said vehicle at a base end of load carrying forks of said vehicle, said at least one jog switch being actuated to move said vehicle when a coast mechanism of said vehicle is activated; and a coast release switch positioned adjacent said rear of said power unit at said base end of said load carrying forks, said coast release switch being actuated to release said coast mechanism and thereby apply a steerable wheel brake.

26. A supplemental control for a walk along materials handling vehicle as claimed in claim 25 wherein said at least one jog switch and said coast release switch are movably positionable to either side of said vehicle.

27. A supplemental control for a walk along materials handling vehicle as claimed in claim 26 wherein said at least one jog switch and said coast release switch are mounted in a housing secured to one end of a tether.

28. A supplemental control for a walk along materials handling vehicle as claimed in claim 25 wherein said at least one jog switch comprises a first jog switch mounted to a first side of said vehicle and said coast release switch comprises a first coast release switch mounted to said first side of said vehicle.

29. A supplemental control for a walk along materials handling vehicle as claimed in claim 28 wherein said at least one jog switch further comprises a second jog switch mounted to a second side of said vehicle and said supplemental control further comprises a second coast release switch mounted to said second side of said vehicle.

30. A supplemental control for a walk along materials handling vehicle as claimed in claim 25 further comprising a steering direction detector to enable movement of said vehicle in response to actuation of said at least one jog switch only when a steered wheel of said vehicle is directed substantially straight ahead.

* * * * *